United States Patent [19]

Danko, Jr. et al.

[11] 4,010,481
[45] Mar. 1, 1977

[54] STEREOMETRIC CAMERA SYSTEM

[75] Inventors: Joseph O. Danko, Jr., Baltimore, Md.; Jaime R. Cuzzi, Houston, Tex.

[73] Assignee: Danko Arlington, Inc., Baltimore, Md.

[22] Filed: Oct. 14, 1975

[21] Appl. No.: 621,785

[52] U.S. Cl. .............................. 354/113; 354/105; 354/203; 354/275

[51] Int. Cl.² ...................................... G03B 35/08

[58] Field of Search .......... 354/113, 112, 110, 105, 354/109, 294, 275, 276, 203

[56] References Cited

UNITED STATES PATENTS

| | | | |
|---|---|---|---|
| 10,987 | 5/1854 | Holmes | 354/113 X |
| 891,013 | 6/1908 | Smith | 354/113 X |
| 1,140,099 | 5/1915 | Barrier | 354/275 X |

*Primary Examiner*—Joseph W. Hartary
*Attorney, Agent, or Firm*—Cushman, Darby & Cushman

[57] ABSTRACT

A camera for use in a stereophotogrammetric assembly including a pair of camera assemblies, each assembly having a pair of cameras located on either side of a flash lamp assembly. Each of the cameras of the assemblies includes a flat transparent plate located in a camera housing, with the camera lens being adjustable with respect to the plate. A resilient plate-like member associated with an overcenter toggle assembly holds a film length against the glass plate for exposure. A film magazine releasably latched to a bottom portion of the camera housing is provided for dispensing the film. Apparatus for providing fiducial marks and a film recordation of the lens adjustment — for stereo-plotting purposes — is provided including an internal flash mechanism in the camera housing with light piping extending to the glass plate. Film wastage is minimized by the location of the lens centerpoint (which corresponds to the fiducial marking centerpoint) off the horizontal center of the film length to be exposed.

21 Claims, 8 Drawing Figures

STEREOMETRIC CAMERA SYSTEM

BACKGROUND AND SUMMARY OF THE INVENTION

The invention relates to a camera useful in a stereophotogrammetric assembly which is, in turn, useful for ultimate close range stereometric measurements of objects such as, for example, of human body forms. Stereometric measurement of body forms from substantially simultaneously recorded front and rear view stereopairs has recently been developed as an effective technique for determining body and limb volume changes and related phenomena for a wide variety of purposes. In this arrangement, a three-dimensional optical model is created from the stereo photo images, which model may be displayed and measured in stereoplotting instruments. The measurements of body geometry which are read off the stereo model can be stored electrically, magnetically, or via other media in graphical or digital form. Reports detailing studies of body geometry by employing stereophotogrammetry in general include "Stereometric Measurement of Body and Limb Volume Changes During Extended Space Missions", Texas Institute for Rehabilitation and Research, Report No. NAS 9-10567 dated March, 1971, and "Experimental Determination of Mechanical Features of Children and Adults", Texas Institute for Rehabilitation and Research, Report No. DOT-HS-231-2-397, dated February, 1974, the disclosures of which are hereby incorporated by reference in the present specification.

In utilizing stereophotogrammetric equipment for quantitative measurement of relatively small close range objects such as the human body it is necessary that precision and accuracy be of foremost importance. The film utilized must be of high resolution so as to register fine lines of distinction, and must be held substantially perfectly flat during exposure thereof in order to obtain quantitatively accurate pictorial representations for stereoplotting. The focusing distance of the camera lenses must be finely adjustable, and the lenses must be positively guided. In order to provide for accuracy in matching up and interpreting the various pictures that are taken to produce a three-dimensional model, fiducial marks and a lens reference should be provided on the pictures themselves. Also, since film of sufficient quality for stereophotogrammetry is expensive, wastage thereof should be minimized.

The camera according to the present invention achieves all the above goals, providing a camera that produces accurate, fiducially referenced pictures with minimum film wastage. The assembly according to the present invention also provides for easy loading and unloading of film with readily releasable positive flat clamping thereof during exposure. Fiducial flash units according to the present invention are self contained within the camera eliminating the need for excessive light piping and the like.

According to the present invention, a stereometric camera is provided for use in an exemplary assembly having a pair of camera supports each having a pair of horizontal guide rails with a middle flash lamp assembly and right and left hand cameras associated therewith. One camera assembly takes a front view of the subject, and the other takes a rear view of the subject. Each camera includes a housing releasably attached to a film housing, the film housing having a handle thereon for ready handling thereof if detached from the camera housing. A lens and solenoid operated shutter assembly are associated with each camera, being mounted in a lens housing which is reciprocally adjustable with respect to the camera housing. Fine adjustment means for the lens housing are provided, and lens reciprocation is positively guided.

A flat glass plate associated with the camera housing is provided for supporting the film. It is necessary that means be provided for holding the film perfectly flat against the glass plate during exposure, and according to the present invention this is provided by a film holding plate-like member of sponge rubber or the like operatively connected to a shaft. In order to provide for ease of movement of the film holder while still providing a tight hold therewith, an overcenter toggle arrangement is provided. The toggle arrangement includes a trigger pivotally mounted to the shaft and to a lever mounted to the film housing, the trigger having a portion thereof adapted to be grasped by the operator's hand. A spring provides a biasing force for normally biasing the holding member into holding position, and the shaft is reciprocally guided by a housing bushing and a bushing through the film housing handle.

Film may be brought into operative relationship with the flat glass plate by a film magazine that is releasably attachable to the film housing. The magazine may comprise a hollow plate-like member having a piece of polyester based film 4-7 mills thick, or the like, disposed therein. A control piece extends from one end of the magazine, and by reciprocation thereof one is able to move the film in and out of the open end of the magazine opposite the control piece. The magazine is releasably connected to the film housing by a pivot and by cooperating latching projections and plates on the magazine and film housing respectively. A continuous controllably advanced film roll can be utilized in place of the magazine.

A fiducial marking assembly is provided for photographically marking the film with accurate fiducial marks during exposure thereof. The fiducial assembly comprises four orifices extending through the glass plate, one located at either side of the film held against the glass plate at the vertical midpoint thereof, and one located on top and one on the bottom of the film being held at opposite points spaced from the horizontal midpoint of the film. Light piping extends from each of these orifices to an internal flash unit which is synchronized with the flash lamp assembly, and a dial indicator driven by lens adjustments to indicate the instantaneous actual focusing distance of the lens is also in the path of the internal flash so that it is registered on the film too in a corner thereof. The lens is also located off horizontal center of the camera housing, toward the strobe assembly, the center of the lens when projected onto the glass plate providing the intersection point of lines extending from one horizontal fiducial orifice to the other and from one vertical fiducial orifice to the other. This arrangement allows for orientation of the film so that there is no wastage thereof in photographing empty space to one side of the subject.

It is the primary object of the present invention to provide improved stereophotogrammetric camera equipment. This and other objects of the invention will become clear from an inspection of the detailed description of the invention, and from the appended claims.

DETAILED DESCRIPTION OF THE INVENTION

Figure 1:
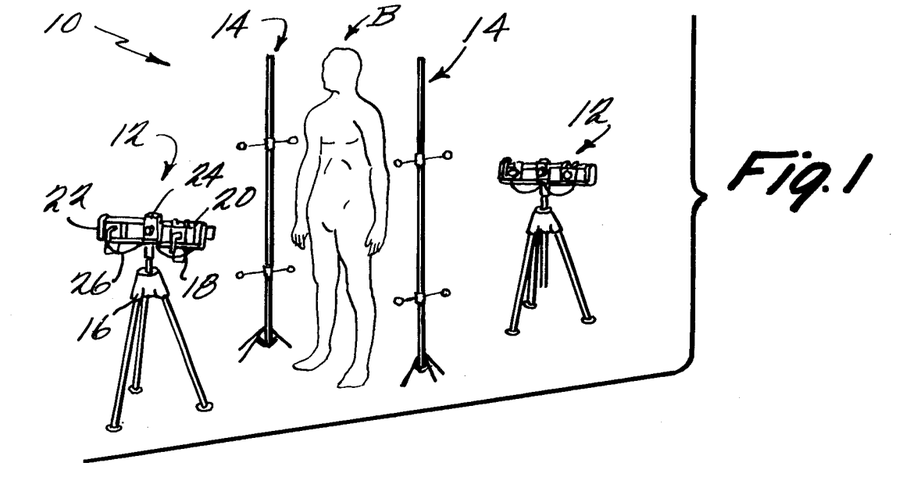
FIG. 1 is a perspective view of an exemplary stereometric camera system using stereometric camera according to the present invention.

An exemplary stereometric camera assembly for measurement of body and limb volumes and the like according to the present invention is shown generally at 10 in FIG. 1. The assembly 10 generally includes a pair of camera assemblies 12, and a pair of control stands 14, which control stands provide a datum or reference plane which is common to both front and rear view camera assemblies 12. This permits the location of points over an individual's entire body surface with a single coordinate system, as well as providing known distances for calibration purposes, as more fully explained in the reports incorporated by reference herein. Each camera assembly 12 comprises a tripod stand 16 or the like, a pair of horizontally extending guide rails 18, a right hand camera 20 mounted for reciprocal movement on rails 18, a left hand camera 22 mounted for reciprocal movement on rails 18, and a flash lamp assembly 24 mounted between the camera 20, 22, and stationary with respect to the stand 16. The flash lamp assembly 24 preferably includes a "surface contrast projector" therewith for projecting a random high contrast "texture" onto the body surface. Such a device is especially useful when the subject is a light-skinned individual. Connectors 26 lead from the flash lamp assembly 24 to both cameras 20, 22, to provide for coordinated operation of all three devices 20, 22, and 24.

Figure 2:
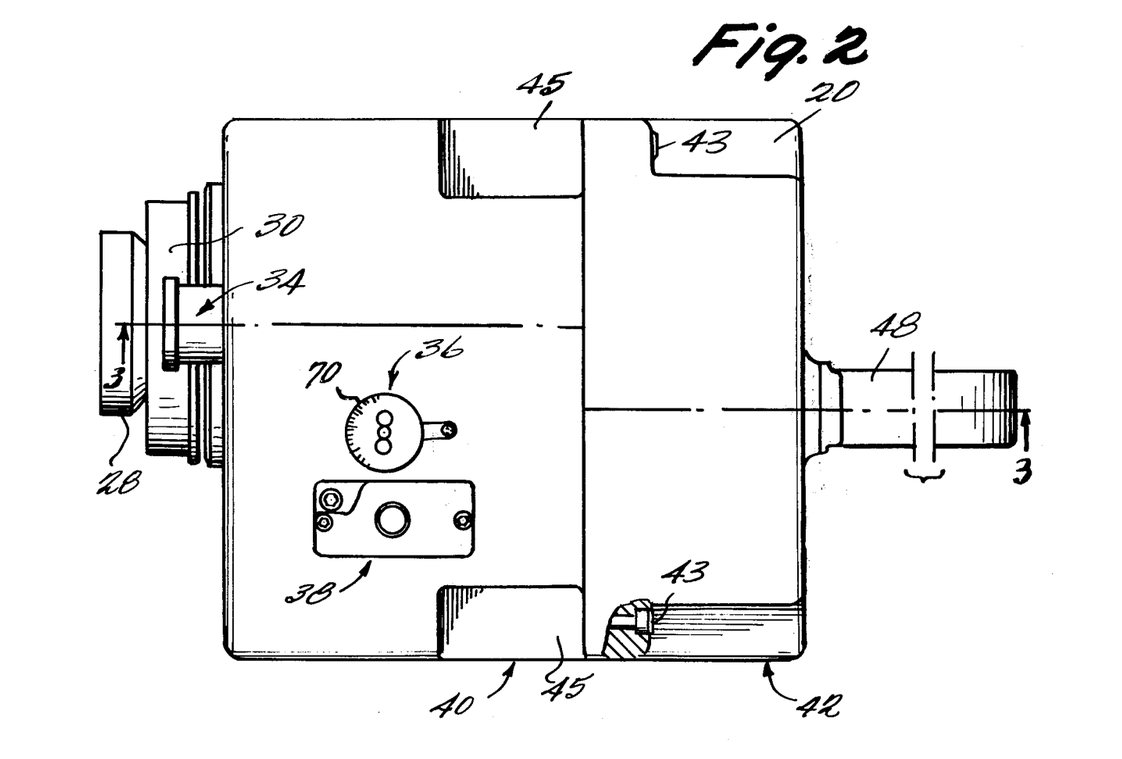
FIG. 2 is a top plan view of one of the individual cameras of the system shown in FIG. 1.

Each camera 20, 22 according to the present invention includes a lens 28 (see FIG. 2 in particular), a shutter assembly 30, a camera housing portion 40, and a film housing portion 42. The lens 28 may be of any suitable type, but preferably comprises one having an effective focal length of 90mm, such as Serial No. 902999 manufactured by Fuji Photo Optical Co. The lens is located off horizontal center, toward the flash lamp assembly 24, of the housing 40 in order to minimize the film wastage in photographing the area outside the stands 14. Each shutter assembly 30 is preferably of the solenoid operated type, controls 32 therefor leading from assembly 30 through connector 26 to flash lamp assembly 24 for coordinated operation therewith. An ILEX Synchro Electronic shutter assembly has been found to be appropriate.

Associated with camera housing 40 is an adjustment assembly 34 for adjustment of the lens focusing distance and an indicator assembly 36 driven thereby for externally indicating the fine current focal adjustment of the lens. A cover plate and lens 38 is also provided to produce an external visual indication of operation of the internal flash, as will be more fully described below. A set of guide collars 45 are mounted on housing 40 for receipt of rails 18 to provide for guided horizontal reciprocation of the cameras 20, 22; a lock screw 46 (see FIG. 3) or the like may be associated with one or more of the collars 45 if desired. The housing 40, 42 is releasably connected together in any suitable manner, such as by a plurality of screws 43. A handle 48 or the like is mounted on housing 42 to provide for easy removal of housing 42 from connection with housing 40 after release of screws 43.

A lens housing 50 (see FIG. 3) is provided for mounting of the lens 28 and shutter assembly 30 for movement with respect to the camera housing 40. The lens housing 50 is received within an opening 51 in the front of the camera housing 40, and a light seal 52 such as felt is provided therebetween to prevent the entry of light or foreign material into the housing 40 through opening 51. The housing 50 is guided in its reciprocal movement by a guide rod 53 (see FIG. 4a) or the like mounted near the top of housing 40, and a guide roller assembly 54 mounted adjacent the bottom of housing 40. A pair of collars 55 affixed to housing 50 receive guide rod 53 therein, and a guide plate 56 affixed to housing 50 is received by the roller assembly 54. As shown most clearly in FIGS. 4a and 4b, the roller assembly 54 may include a roller support plate 57 attached to the bottom of housing 40 which supports rollers 58, 59 thereon for rotation about vertical axes. The rollers 58, 59 receive plate 56 therebetween.

Adjustment means 34 is provided for reciprocating housing 50, as guided by means 53, 54, for adjusting the focal plane of the lens 28 dependent upon the distance the subject is from the camera 20, 22. The adjustment means 34 (see FIG. 3) includes a dial 62 connected to a shaft 64, which shaft is rotatable in bushing 65. The exterior surface 63 of dial 62 has markings thereon which may cooperate with a stationary marking on housing 40 to indicate the relative position of the dial 62. Forming a part of shaft 64 is a screw drive portion 66. The screw drive portion 66 cooperates with nut 68 affixed to housing 50. As screw 66 rotates, the rotational movement thereof is transformed into reciprocal movement of the housing 50 by the interengagement of portion 66 and nut 68.

Figure 4A:
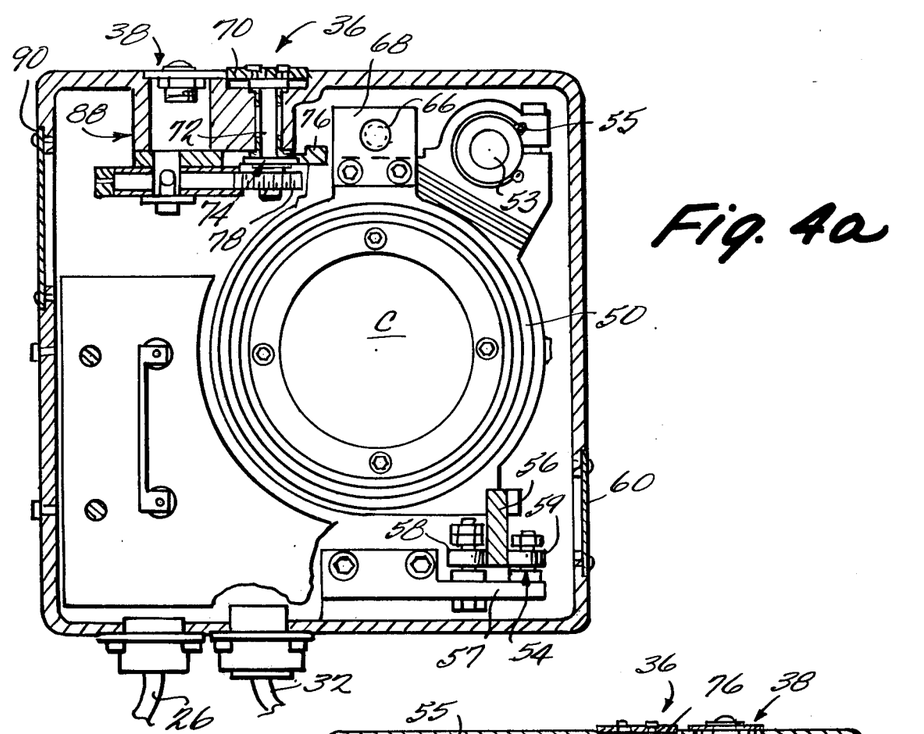
FIGS. 4a and 4b are cross-sectional views taken along lines 4—4 of FIG. 2 of the right-hand and left-hand cameras respectively of the camera system of FIG. 1.
Figure 4B:
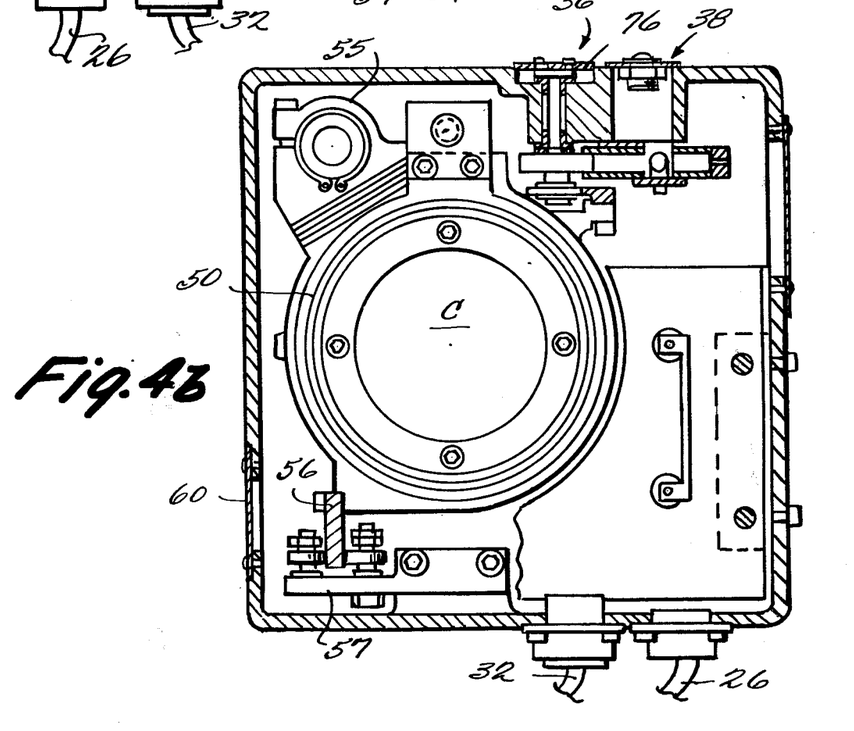
Figure 5:
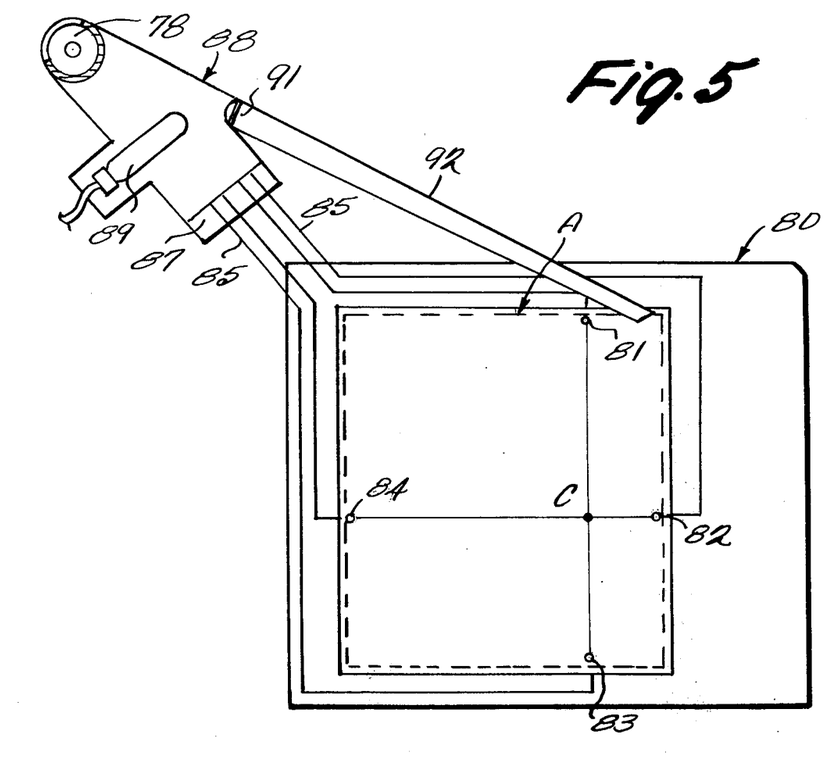
FIG. 5 is a schematic showing of the internal flash and light piping assembly of the camera of FIG. 2.

The indicator means 36 (see FIGS. 4a and 4b) located on top of the camera includes a dial 70, shaft 72, gear member 74, and rack 76. The dial 70 preferably has markings on the exterior thereof for cooperation with markings on the top of housing 40 to provide for indication of the position of the lens 28 relative thereto. Rotation of dial 70 is caused by rotation of shaft 72 connected thereto, and in turn by rotation of gear or pinion member 74 connected to shaft 72. Pinion member 74 rotates due to reciprocation of rack 76 in operative engagement therewith, rack 76 being rigidly attached to the movable lens housing. Also provided on shaft 72 is an internal indicator 78 which has markings thereon indicating the relative position of the lens 28. Via optical apparatus 88 (see FIG. 5), the reading of indicator 78 is projected toward and recorded directly upon the film when internal flash 89 is activated which as previously explained, also simultaneously causes the fiducial marks to be photographed via light pipes 85.

Figure 3:
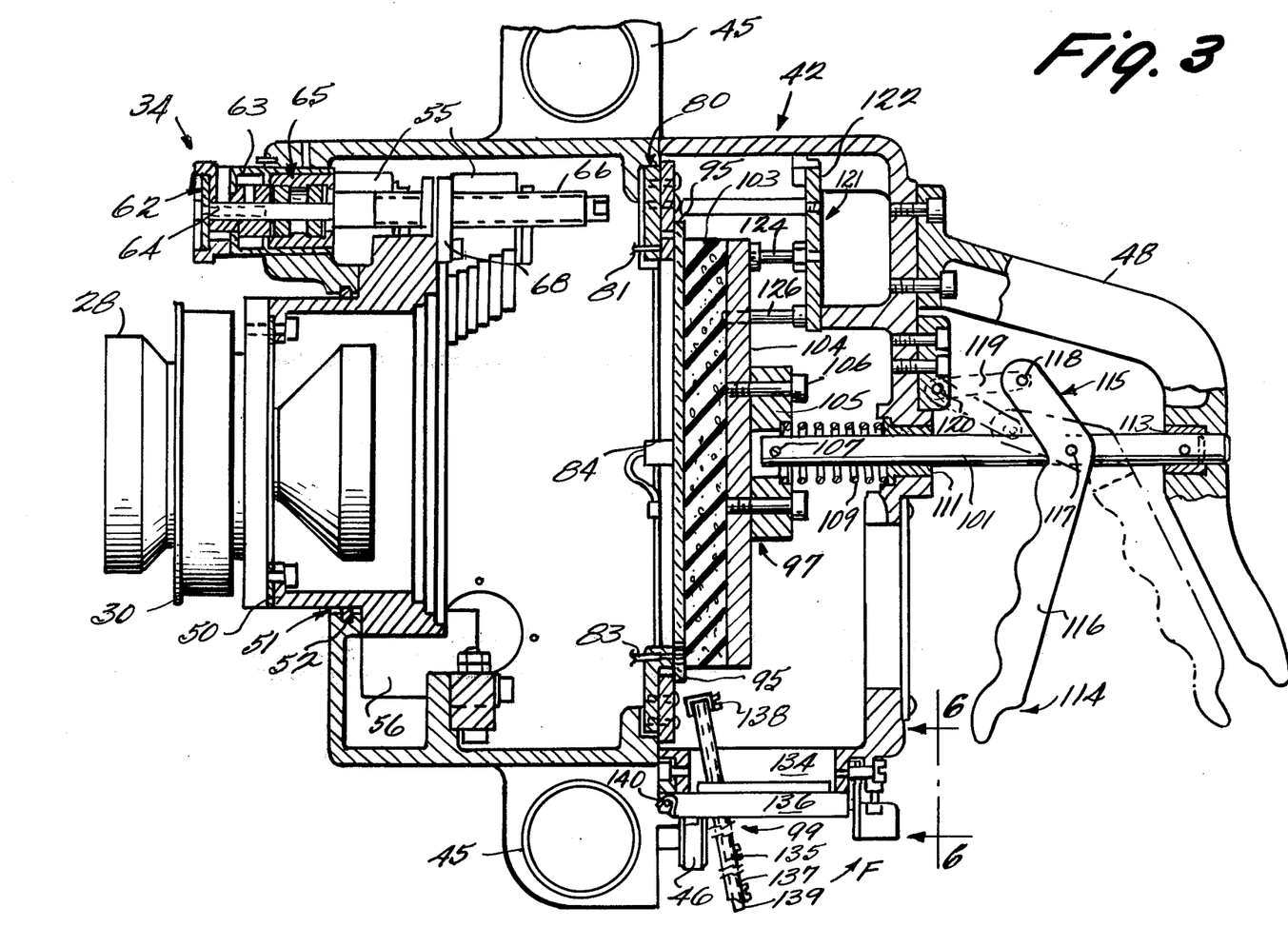
FIG. 3 is a cross-sectional view, with some parts in elevation of the camera of FIG. 2 taken along lines 3—3 of FIG. 2.
Figure 7:
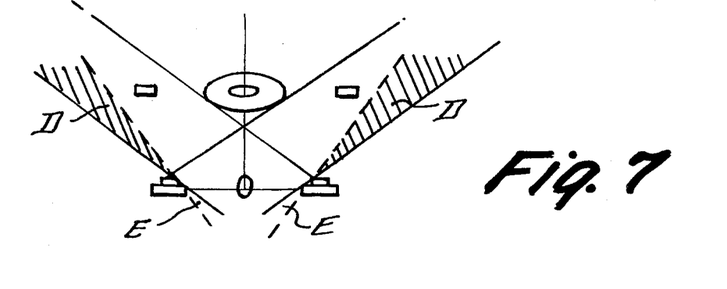
FIG. 7 is a schematic view of an assembly according to the present invention taking a picture of a subject, with viewing area thereof accented.

In order to provide assistance in reconstructing the camera geometry for stereoplotting purposes, and to support the film during exposure, a plate assembly 80 is provided, which cooperates with apparatus 88. The means 80, 88 acting together provide for the recordation of particular fiducial reference points on the film, as well as the indicator 78 marking, which provides for reduced effort and increased accuracy during subsequent stereoplotting. As seen most clearly in FIGS. 3 and 5, the fiducial plate assembly generally comprises a plate member having four light pipe orifices 81, 82, 83, and 84 passing therethrough. The light pipe orifices also pass through a glass plate 95 disposed on the plate assembly 80, and have a point of registry on a film pressed against the plate 95 (shown at 137 in FIG. 3, shown in dotted line at A in FIG. 5). Each light pipe orifice 81, 82, 83, 84 is connected to a light pipe 85, each pipe 85 preferably may be Dupont CROFON light piping, isolated from the surrounding internal camera environment by black spaghetti. The light pipe orifices 82 and 84 are disposed at the vertical midpoint of a film frame disposed on glass 95, while the light pipe orifices 81 and 83 are not disposed at the horizontal midpoint of a film frame A, but rather are disposed offcenter with respect thereto. The intersection of lines extending between 81 and 83 and 82 and 84 is at point C, which is the centerpoint of lens 28 (see FIGS. 4a and 4b), which as mentioned above is off horizontal center of housing 40. This particular arrangement of the film frame A with respect to plate assembly 80 and lens 28, and the location of the point C by the light pipes, allows a minimum amount of film to be utilized for photographing a given subject. As shown diagrammatically in FIG. 7, each of the cameras 20 and 22 would record the image of a portion D outside stands 14 that is wasted, no subject being therein, if film were provided behind the lenses 28 in a conventional manner. With the arrangement according to the present invention, no film is disposed in the interior portion E of the cameras that corresponds to the portion D; indeed there is no complete interior portion E.

Recordation of fiducial marks by pipe orifices 81, 82, 83, and 84 on a film frame A, which allow determination of the center C of the lens 28 during stereoplotting is provided by the cooperation of apparatus 88 with the pipe orifices 81, 82, 83 and 84. Extending from each point 81, 82, 83, 84 about the light pipes 85 to a terminal portion 87, as mentioned above, is a piece of isolating surrounding "black spaghetti". Mounted within apparatus 88 for providing light for the light pipes 85 is an internal flash, or lamp 89, which may be a properly pulsed Lee Craft 6v, 0.075 amp. lamp. When the flash lamp assembly 24 for a camera assembly 12 is actuated, the internal light flash 89 for each camera 20, 22 is also activated, which results in light travelling through pipes 85 and being recorded at points 81, 82, 83, and 84 on a film frame A, and which results in light being reflected off indicator 78, through lens 91 and piping 92, to a corner of film frame A, whereby the focal setting of lens 28 is recorded on the film along with the fiducial marks. The lens 38 located on the top of housing 40 provides an external visual indication that the internal lamp 89 has flashed.

As seen most clearly in FIG. 3, the plate assembly 80 and glass plate 95 associated therewith are attached to camera housing 40. The plate 95 must be a substantially flat plate to insure that resulting pictures have the necessary accuracy for stereoplotting purposes. A means must also be provided for tightly holding a film frame A against the flat plate 95 to insure accuracy, and means must be provided for accurately and positively feeding the special film necessary into operative relationship with plate 95. Such holding and feeding means are shown generally at 97 and 99 in FIG. 3.

The film frame holding means 97 preferably comprises a reciprocal shaft 101 having a holding member 103 operatively attached to one end thereof inside the film housing 42. The holding member 103 preferably comprises a plate-like portion of resilient material such as open or closed cell sponge rubber for engaging the film frame and for insuring that the film frame is disposed as flatly as possible against flat glass plate 95. Apparatus for operatively attaching the member 103 to shaft 101 may include a backup plate 104 of generally rigid material for member 103, a mounting ring 105 attached to plate 104 with bolts 106 or the like, and a roll pin 107 attaching shaft 101 to ring 105 in a manner allowing relative pivotal movement therebetween. The ring 105, and shaft 101 connected thereto, is preferably spring biased by coil spring 109 or the like to the position shown in FIG. 3 — that is the position wherein member 103 holds a piece of film tightly against plate 95. The shaft 101 is horizontally reciprocal, being guided in bushing 111 in housing 42, and bushing 113 in handle member 48.

In order to provide for quick positive movement of the shaft 101 with respect to the housing 42, and for latching of the shaft 101 in the position to which it is moved, an overcenter toggle assembly 115 or the like may be provided. The assembly 115 includes a trigger 116 having a hand grip portion 114 at one end thereof, and being pivotally connected at the other end thereof to a lever 119, as by a pivot pin 118, and being pivotally connected to shaft 101 as by pivot pin 117 located at a point therealong intermediate it ends. The lever 119 is connected at the end thereof opposite the pivot pin 118 to the housing 42, as by pivot pin 120. The assembly 115 is clearly a toggle assembly which latches at either position overcenter — that is in the positions shown in full line and dotted line in FIG. 3. When the trigger 116 is moved to the dotted line position against the bias of spring 109, the member 103 is moved away from the plate 95, and a film frame disposed therebetween is released.

A means 121 is provided above film frame holding means 97 for cooperation therewith in providing positive frictional engagement of film fed thereto. The means 121 generally comprises a stationary plate 122 having a pair of spaced adjustable shafts 124 associated therewith. Adjustment of each of the shafts 124 is provided so that there is only a small clearance between the plate 104 and the shafts 124 when the means 97 is in the film latching position shown in FIG. 3 (i.e., 0.010 inches with 4–7 mil thick film). When the means 97 is released from latching position, shafts 124 bear against plate 104, and prevent movement thereof more than the above-mentioned clearance (i.e., 0.010 inches). The lower portion of plate 104 will thus pivot about pivot pin 107 when moving to the unlocking position. Guide rods 126 cooperating with the edges of holding member 103 may be provided to prevent anything but longitudinal and pivotal movement of the plate 104. The provision of shafts 124 thus allows a small frictional force to be continuously applied to the top of a piece of film A located within housing 42 so that it will not fall downwardly when released without a slight "tug" applied thereto, and so that positive holding thereof during film loading is provided.

Figure 6:
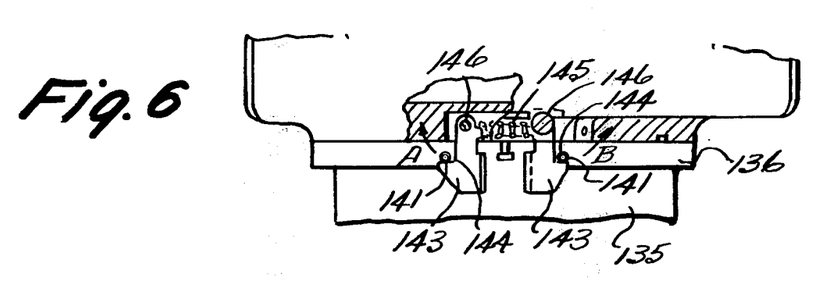
FIG. 6 is partly cross-sectional and partly elevational view of the camera of FIG. 3 taken along lines 6—6 of FIG. 3.

Means 99 are provided for allowing ready placement of a special piece of film in proper location adjacent plate 95, and for ready removal and replacement of the film with a minimum chance of extraneous light ruining the film. A film that has been found most suitable for use with cameras 20, 22 according to the present invention is a stable polyester base film 4–7 mils thick known as DuPont CRONAR or Kodak Estar. Such film provides positive accurate images, and may be pressed very flatly against the glass plate 95. A means 99 for inserting and removing the film (137) into the film housing 42 preferably includes a magazine portion 135 and a positioning portion 136. The magazine 135 comprises a rectangular hollow member having a film frame 137 disposed therein. Open end 138 of magazine 135 cooperates with opening 134 in the bottom of housing 42. The film frame is connected at the end thereof opposite the open end 138 of magazine 135 to a slide member 139. By reciprocating the slide member 139 generally vertically in the plane of the magazine 135, the film 137 may be moved into operative engagement with the plate 95, and removed from engagement therewith. The positioning portion 136 of assembly 99 (see FIGS. 3 and 6 especially) is releasably pivotally connected at 140 to the housing 42 at one end thereof, and has latching projections 141 or the like formed at the other end thereof. When end 140 is in pivotal engagement with the housing 42 and the assembly 99 is pivoted upwardly in direction F, projections 141 cam latch plates 143 out of their way against the bias of springs 145, and are then held by surfaces 144 of plates 143 in the position shown in FIG. 3, wherein the magazine 135 is in proper position for film 137 to be moved into and out of housing 42, and wherein the bottom opening 134 of housing 42 is closed off so that no light may enter therethrough. To release the means 99 from latched engagement with plates 143, it is necessary only to pivot the plates 143 against the bias of springs 145 about pivots 146 until surfaces 144 no longer block projections 141.

While a particular film dispensing means 99 for dispensing an individual film frame 137 has been described above, other film dispensing means could be provided. For instance, a roll of film could be mounted on the top of the housing 42, and a take-up roll mounted on the bottom thereof, and the film could be moved by any suitable manual or automatic means. A film holding means 97 or the like would still have to be provided, of course, and the means 97 disclosed in the drawings would be suitable for this purpose.

Apparatus according to the present invention now having been described, a typical operation thereof for stereophotogrammetric measurement will now be set forth. A subject B is placed between the stands 14, and the camera assemblies 12 are placed to the front and the rear thereof. The cameras are adjusted so that the height of the cameras is at the midpoint of the subject, and the cameras are horizontally adjusted so as to include the subject and the control stands 14, but so that as little extraneous area D as possible is photographed. The cameras are disposed the same distance from the subject, and are focused to provide sufficient depth of field to include both the nearest surface of the subject and the control tapes in the zone of sharp focus. Adjustment of the focusing distance of the lens 28 of each camera is provided by adjustment means 34.

Once the camera assemblies are properly adjusted, the cameras are loaded with film. This is accomplished by (1) moving the trigger 116 of each camera toward handle 48 (see dotted line position in FIG. 3), which moves the holding member 103 away from the glass plate 95, (2) attaching the film assembly 99 to the film housing 42 by latching projections 141 with latch plates 143, (3) moving the film 137 into engagement with plate 95 by pushing upwardly on member 139, and (4) clamping the film 137 into engagement with the plate 95 by moving trigger 116 back over center under the influence of spring 109 to the solid line position in FIG. 3. The pictures are then snapped by activation of the synchronized shutters of the cameras which via their X-synchronization electrical switches, in turn activate the internal flashes and the central flash lamp assemblies 24. It is preferred that the assemblies 24 are interconnected and so timed that one flashes only a few milliseconds or so after the other so that there is no interference on one side with the opposite side's flash, but so that the subject does not have time to move. Internal lights 89 of each camera 20, 22 will be actuated at substantially the same time as the respective assemblies 24 and solenoid operated shutters 30, and simultaneous recordation of reference marks and indicator 78 setting will thus be provided on the film by the apparatus 88 and light pipe junctions 81–84.

After the pictures are taken, the exposed film 137 is removed by release of holding assembly 97 and withdrawal of the film 137 into the magazine 135, and by subsequent release of latch plates 143. Once the pictures are developed, stereo-plotting is pursued in conventional manners such as, for example, that described in the afore-mentioned incorporated reports "Experimental Determination of Mechanical Features of Children and Adults" and "Stereometric Measurement of Body and Limb Volume Changes During Extended Space Missions".

It will thus be seen that a stereometric camera assembly has been provided according to the present invention that requires a minimum amount of film, that provides for positive, quick, accurate holding and placement of film for stereometric purposes with a maximum amount of accuracy, and that provides for proper fudicial markings of the film for increased accuracy. While the invention has been herein shown and described in what is presently conceived to be the most practical and preferred embodiment, it will be apparent to those of ordinary skill in the art that many modifications may be made thereof within the scope of the present invention, which scope is to be accorded the broadest interpretation of the appended claims so as to encompass all equivalent structures and devices.

What is claimed is:

1. A camera for a stereophotogrammetric assembly, comprising:
   a. a camera housing,
   b. a flat transparent plate in said camera housing,
   c. a lens associated with said housing, said lens being adjustable with respect to said flat plate,
   d. means for adjusting the distance of said lens from said glass plate, and
   e. means for holding a film length flatly against said flat transparent plate during exposure of said film, said means comprising (i) a film engaging member, (ii) a shaft operatively connected at one end thereof to said film engaging member by means for allowing pivotal movement therebetween, (iii)

means for biasing said film engaging member into engagement with said flat plate, for flatly pressing a film length located between said transparent plate and said member against said transparent plate, and (iv) means located exteriorly of said housing attached to said shaft for moving said film engaging member from a position pressing said member into engagement with said film to a position wherein said member is spaced from said glass plate and film disposed between said plate and said member may be removed therefrom.

2. A camera as recited in claim 1 wherein said film engaging member comprises a plate-like member formed of resilient material.

3. A camera as recited in claim 2 wherein said resilient material is sponge rubber.

4. A camera as recited in claim 1 further comprising means for positioning a film length adjacent said flat plate to be held thereagainst by said holding means, said film positioning means comprising a magazine containing said film length and having an open end thereof adapted to be received by said camera housing, a positioning member disposed adjacent said open end of said magazine and including a latching projection thereon, and a latch plate formed on said camera housing for receipt of said latch projection for holding said magazine onto said camera housing.

5. A camera as recited in claim 4 wherein said positioning member further comprises a hinge member attached to said positioning member for engaging a hinge pin on said camera housing for pivotally mounting said magazine.

6. A camera as recited in claim 1 wherein said camera housing includes two separable portions, a front portion for housing said flat plate and for receipt of said lens, and a back portion for containing said film holding means, said back portion having a handle associated therewith for cooperation with said shaft moving means located exteriorly of said back portion.

7. A camera as recited in claim 1 further comprising a lens housing and means for guiding said lens housing for reciprocal movement with respect to said camera housing, said guiding means including a guide rod mounted in said camera housing and a pair of guide rollers mounted in said camera housing, and a collar affixed to said lens housing for receipt of said guide rod, and a plate affixed to said lens housing for receipt between said guide rollers.

8. A camera as recited in claim 1 wherein said means for adjusting the distance of said lens from said flat plate includes adjustment means for reciprocating a lens housing containing said lens, said adjustment means comprising a dial, a shaft connected to said dial, means mounting said shaft for rotary motion with respect to said housing, a screw portion formed on said shaft, and a nut rigidly attached to said lens housing for receiving said shaft screw portion and for transforming rotation movement of said shaft into linear movement of said lens housing.

9. A camera as recited in claim 1 further comprising means for limiting the movement of a top portion of said film engaging member away from said transparent plate so that film is loosely supported against said transparent plate by said film engaging member even after movement of said shaft against the bias of said film engaging member biasing means.

10. A camera for a stereophotogrammetric assembly, comprising:

a. a camera housing,
b. a flat transparent plate in said camera housing,
c. a lens associated with said housing, said lens being adjustable with respect to said flat plate,
d. means for adjusting the distance of said lens from said glass plate, and
e. means for holding a film length flatly against said flat transparent plate during exposure of said film, said means comprising (i) a film engaging member, (ii) a shaft operatively connected at one end thereof to said film engaging member, (iii) means for biasing said film engaging member into engagement with said flat plate, for flatly pressing a film length located between said transparent plate and said member against said transparent plate, and (iv) means located exteriorly of said housing attached to said shaft for moving said film engaging member from a position pressing said member into engagement with said film to a position wherein said member is spaced from said glass plate and film disposed between said plate and said member may be removed therefrom, said means located exteriorly of said housing for moving said member with respect to said flat plate comprising an overcenter toggle assembly operatively connected to said shaft and said housing, said overcenter toggle assembly comprising a trigger member having a first end thereof adapted to be grasped by an operator's hand, a second end of said trigger member pivotally connected to a lever, means pivotally mounting said trigger member intermediate the ends thereof to said shaft member, and means for pivotally connecting said level to said housing.

11. A camera as recited in claim 10 wherein said shaft is reciprocal, and wherein said housing includes a handle operatively connected thereto, said shaft being reciprocally guided by bushings through said housing and through said handle.

12. A camera as recited in claim 11 further comprising means for pivotally operatively connecting said shaft to said film holding member.

13. A camera for a stereophotogrammetric assembly, comprising:

a. a camera housing,
b. a flat transparent plate in said camera housing,
c. a lens associated with said housing, said lens being adjustable with respect to said flat plate,
d. means for adjusting the distance of said lens from said glass plate,
e. means for holding a film length flatly against said flat transparent plate during exposure of said film, said means comprising (i) a film engaging member, (ii) a shaft operatively connected at one end thereof to said film engaging member, (iii) means for biasing said film engaging member into engagement with said flat plate, for flatly pressing a film length located between said transparent plate and said member against said transparent plate, and (iv) means located exteriorly of said housing attached to said shaft for moving said film engaging member from a position pressing said member into engagement with said film to a position wherein said member is spaced from said glass plate and film disposed between said plate and said member may be removed therefrom, and
f. means for providing fiducial marks on a piece of film held against said glass plate during exposure of said film, said means comprising a plurality of light pipes extending through orifices in said transparent plate, and to a flash unit located interiorly of said housing.

14. A camera as recited in claim 13 wherein said means for providing fiducial marks further includes means for quantitatively recording the focal adjustment of said lens position on the film length held against said flat plate during exposure of said film, said means including a marked indicator in a light path of said internal flash unit and a light pathway extending from said marked indicator to a normally unused portion of said transparent plate, and a lens disposed in said light pathway for focusing an image of marks from said marked indicator onto said film when said internal flash unit is activated.

15. A camera as recited in claim 13 wherein four fiducial orifices are provided, one orifice located at each side of a film length held against said transparent plate at the vertical midpoint of the intended position of said film length, and one orifice being located at each of the top and the bottom of the intended position of said film length opposite each other and offset from the horizontal midpoint of the film length.

16. A camera for a stereophotogrammetric assembly, comprising:
   a. a camera housing,
   b. a flat transparent plate in said camera housing,
   c. a lens associated with said housing, said lens being adjustable with respect to said flat plate,
   d. said lens having a center point thereof and the horizontal center line of a film length held flatly against said transparent plate being horizontally spaced from said lens center point,
   e. means for adjusting the distance of said lens from said glass plate, and
   f. means for holding a film length flatly against said flat transparent plate during exposure of said film, said means comprising (i) a film engaging member, (ii) a shaft operatively connected at one end thereof to said film engaging member, (iii) means for biasing said film engaging member into engagement with said flat plate, for flatly pressing a film length located between said transparent plate and said member against said transparent plate, and (iv) means located exteriorly of said housing attached to said shaft for moving said film engaging member from a position pressing said member into engagement with said film to a position wherein said member is spaced from said glass plate and film disposed between said plate and said member may be removed therefrom.

17. A camera as recited in claim 16 wherein a film length held flatly against said flat transparent plate is a polyester base film 4–7 mils thick.

18. A stereometric camera assembly comprising:
   a. a mounting means.
   b. a pair of generally horizontally extending guide rods disposed on said mounting means,
   c. a flash lamp assembly mounted substantially at the horizontal midpoint of said guide rods,
   d. a first camera mounted on one side of said flash lamp assembly for guided movement by said guide rods,
   e. a second camera mounted on the other side of said flash lamp assembly for guided movement by said guide rods,
   f. each of said cameras having a lens and a solenoid operated shutter,
   g. means for interconnecting said flash lamp assembly and said solenoid operated shutters of said cameras for synchronous operation of said shutters with said flash lamp assembly, and
   h. an internal flash for each camera for providing fiducial marks on a film length to be exposed upon synchronous operation thereof with said flash lamp assembly and said solenoid operated shutters.

19. An assembly as recited in claim 18 wherein each of said cameras further includes a flat transparent plate against which a piece of film to be exposed is held, and wherein said internal flash of each camera has a plurality of light pipes extending therefrom for cooperation with orifices penetrating said transparent plate for providing a plurality of fiducial marks on a piece of film held against said transparent plate.

20. An assembly as recited in claim 18 further comprising means for recording the relative position of the lens of each camera to the camera housing on a film length to be exposed, said means including an indicator member for indicating the relative lens position associated with said internal flash, and means for transporting light reflecting off said indicator member to said flat plate for recordation on a piece of film held thereagainst during operation of said flash.

21. An assembly as recited in claim 18 wherein each of said camera lenses has a center point, and wherein a piece of film in each of said cameras has a horizontal center-line, and wherein each of said cameras further comprises means for holding said film piece so that the horizontal center-line thereof is horizontally spaced further from said flash lamp assembly than the center point of its respective lens.

* * * * *